Patented Sept. 11, 1951

2,567,906

UNITED STATES PATENT OFFICE 2,567,906

PREPARATION OF PHENETHYLAMINE COMPOUNDS

Walter H. Hartung, Baltimore, Md., assignor to Sharp & Dohme, Incorporated, Philadelphia, Pa., a corporation of Maryland No Drawing. Application January 31, 1947, Serial No. 725,752

5 Claims. (Cl. 260—570.6)

This invention concerns the preparation of para-aminophenylpropanolamine and its salts, as well as intermediates for their preparation.

United States Patent No. 1,898,258 to Oberlin describes the preparation of the monohydrochloride of 1-(para-aminophenyl)-2-amino-1-propanol by the catalytic reduction of 1-(para-nitrophenyl)-2-amino-1-propanol obtained by nitrating 1-phenyl-2-amino-1-propanol with equal volumes of sulfuric acid (1.84 sp. gr.) and nitric acid (1.4 sp. gr.) and keeping the temperature under 10° C. This procedure has certain disadvantages arising from the use of the nitrating mixture since the nitrating reagents are prone to behave to a degree as an uncontrollable oxidizing agent with concomitant undesirable side reactions and consequent low yields. For example, reported over-all yield of the dihydrochloride of the para-amino derivative by this route is 4.8%. According to the basic procedure of the invention described herein, the para-aminophenyl-propanolamine has been obtained in greatly increased yields.

The desired end product of the basic procedure covered by the invention is best obtained by using para-aminopropiophenone as starting material. At the same time, there was developed as part of this invention improvements in preparing this starting material, according to which it was found that p-amino-propiophenone is obtained in greatly increased yields by starting with aniline and dissolving it in carbon bisulfide, adding propionyl chloride (in the ratio of at least 2 mols to 1 mol of aniline) to that solution, then adding an anhydrous aluminum halide, for example, aluminum chloride, as condensing agent, in portions of a little at a time (as, for example, about one-ninth or one-tenth of a mol per mol of propionyl chloride) and heating at about 45–46° C. until hydrogen chloride evolution ceases. Accordingly this portion of the invention is illustrated by, but not entirely restricted to, the following embodiment:

Example 1.—Preparation of p-aminopropiophenone: Into a five liter, three-necked, round-bottomed flask, fitted with a reflux condenser with its upper end connected to a gas-absorption trap, a sealed mechanical stirrer, and a dropping funnel, are placed 139.6 grams (1.5 mols) of aniline and 1600 cc. of carbon bisulfide. The reaction flask is immersed in a bath of cold water (20°–25° C.) and to the rapidly stirred solution are slowly added drop by drop 277.5 grams (3.0 mols) propionyl chloride.

The dropping funnel is then replaced by a small powder funnel and during the course of 30 minutes, 400 grams (3 mols) of anhydrous aluminum chloride are added in 15 gram portions to the rapidly stirred mixture; the hydrogen chloride evolved from the reaction while the condensing agent is added is removed by keeping the reaction apparatus under slightly reduced pressure. After all of the aluminum chloride has been added, stirring and refluxing of the carbon bisulfide at 45°–46° C. is continued on a water bath, until evolution of hydrogen chloride ceases (approximately 5 hours). The mixture is then cooled and surrounded by an ice bath, and while stirring, 100 cc. of cold 10% hydrochloric acid are added drop by drop, while keeping the temperature below 30° C. Then sufficient ice water is added slowly to decompose the complex and dissolve the aluminum chloride. The reaction mixture is suction filtered and the various layers are allowed to separate in a large separatory funnel. The solid material filtration residue is recrystallized from hot water. It is p-propionyl-aminopropiophenone (yellow crystals), M. P. 149–150° C. The other material in the separatory funnel is allowed to separate completely, forming three layers. The lowest layer, containing the carbon bisulfide, is carefully removed and the solvent distilled off, leaving a residue of about 2–3% of the theoretical amount of p-propionylaminopropiophenone. The second (or aqueous) layer is drawn off and made alkaline with excess 10% sodium hydroxide solution, and the liberated solid is filtered off, washed, and recrystallized from 40% alcohol, yielding yellow crystals of p-aminopropiophenone melting at 140° C.

The third (or topmost) layer, a thick, orange to black oil, containing the bulk of the crude p-propionylaminopropiophenone, is hydrolyzed by mixing it with at least 500 cc. of 15–20% hydrochloric acid and refluxing for two to three hours. Decolorizing charcoal is then added to the boiling solution and an equal volume of water is added, and the mixture is then again brought to boiling, after which it is allowed to cool, and the carbon is removed by filtration. The cool filtrate is made alkaline with 10% sodium hydroxide solution, and the precipitated p-aminopropiophenone is filtered off on a Büchner funnel, washed with cool water and recrystallized from 40% alcohol from which it deposited as yellow needles melting at 140° C. (corrected). This procedure gives 20–25% of the possible theoretical yield of p-aminopropiophenone.

The method of preparation of 1-(p-aminophenyl)-2-amino-1-propanol according to this invention using p-aminopropiophenone as the starting material, basically includes converting its p-amino group to a group reconvertible to the free-amino group and selected from the group reducible to the free-amino group, namely, the nitro group, and acylamino groups hydrolyzable to the free-amino group, namely, acylamino groups preferably derived from fatty acids, and especially from lower molecular fatty acids, and benzoic acid, treating the resulting derivative with reagents, and under conditions, adapted to produce the corresponding p-(acylamino or nitro)phenyl - alpha - oximino - propiophenone, subjecting the latter to reduction conditions capable of reducing the alpha-oximino group to a free-amino group, and the keto group to the secondary alcohol group, and of converting the p-(acylamino or nitro) group to the free-amino group.

Accordingly, one of the aspects of the process of the invention is that application of the basic process, in which the 1-(p-aminophenyl)-2-amino-1-propanol is obtained by mono-acetylating the p-amino group of the p-aminopropiophenone, converting the resulting p-acetylamino intermediate obtained to the corresponding p-acetylamino-alpha-oximinopropiophenone, and then converting the latter, by a first stage of reduction, to the alpha-amino ketone reduction product, and by a second reduction stage converting the keto group of the latter to the secondary alcoholic group. During this reduction there occurs the hydrolyzing off of the acetyl substituent to leave free the p-amino group on the phenyl nucleus. Accordingly, this procedure is illustrated by, but not restricted to its following embodiment:

*Example 2.—p-Acetamidopropiophenone:* 15 grams (0.1 mol) of the p-aminopropiophenone (as above obtained) are refluxed with an excess (30 cc.) of acetic anhydride for half an hour, the reaction mixture then allowed to cool, and thereafter 30 cc. of cool water are added and the solution brought to boiling. The solution is then permitted to cool, and the resulting precipitated p-acetamidopropiophenone is removed by filtration through a Büchner funnel and is washed with cold dilute hydrochloric acid and the washings added to the original filtrate. The precipitated product on the funnel, after recrystallization from water, weighed 15 grams (0.078 mol; and 80% yield) and melted at 172–173° C. (corrected). On making the filtrate alkaline with 10% sodium hydroxide solution and cooling, 2 grams of the free p-aminopropiophenone are recovered bringing the yield of the acetylated product to 86% based on starting material actually used.

*Example 3.—p-Acetamido-alpha-isonitrosopropiophenone:* In a 500 cc. 3-necked, round-bottomed flask provided with a sealed mechanical stirrer, a reflux condenser connected to a gas-absorption trap, a delivery tube for hydrogen chloride, and a small dropping funnel, 20 grams of p-acetamidopropiophenone (0.10 mol as above obtained) are suspended in 400 cc. of ether. Dry hydrogen chlorine is passed through the stirred solution at 2–3 bubbles per second, and the addition of acid and stirring are continued throughout the rest of the reaction. Then 13.5 grams of freshly distilled butyl nitrite (0.13 mol) are added in 0.5 cc. portions through the dropping funnel (after addition of the first portion, the reaction mixture turns a slightly orange color and after several minutes, a lighter color, after which a second portion of nitrite is added with a similar color change occurring, whereupon the third portion is added, and so on; at no time is solution complete but the crystals undergo the change in color, white to slightly yellow, and in structure as the reaction proceeds). The mixture gradually warms up and the ether begins to reflux gently. After the addition of all of the nitrite (in about one and one-half hours), the stirring and hydrogen chloride addition are continued for another one-half hour, when the reaction mixture is allowed to stand overnight at room temperature. Then the ethereal solution is slowly stirred into dilute sodium hydroxide solution containing pieces of ice, and the ethereal suspension is repeatedly extracted with further portions of the cold alkali solution until no more product is obtained. The combined alkaline extracts are slowly stirred into concentrated hydrochloric acid containing sufficient ice to keep the reaction mixture cold, from which are obtained 17.0 grams (75% yield, theoretical) of white crystals melting at 216° C. (corrected). After decolorization with charcoal and recrystallization from 50% alcohol, the purified p-acetamido-alpha-isonitroso-propiophenone (a new compound) melted at 218–219° C. (with decomposition) and no further change resulted from further recrystallizations.

While butyl nitrite was used as the nitrosating reagent in the preceding example, and is generally to be preferred, the procedure of the example can be repeated by replacing the quantity of butyl nitrite used by the stoichiometric equivalent quantity of other alkyl nitrites, and preferably a lower alkyl nitrite, and particularly one liquid at room temperature and atmospheric pressure, as ethyl nitrite, isopropyl nitrite, amyl nitrite, n-hexyl nitrite, and 2-ethyl-hexyl nitrite, although those alkyl nitrites, as methyl nitrite, that are gaseous at room temperatures and atmospheric pressure may also be used.

While this procedure according to the invention is particularly advantageous when conducted by treating the p-aminopropiophenone starting material, with acetic anhydride, as in Example 2, that starting material can be acylated with other carboxylic acid anhydrides, especially another fatty acid anhydride, particularly a lower fatty acid anhydride such as propionic or caproic acid anhydride, and the like, although the corresponding acid chloride can be used in place of the acid anhydride, with or without having a basic substance present in the acylation reaction mixture, as for example, with the corresponding acid chloride of the various anhydrides just noted, or also with benzoyl chloride. Then the resulting p-acylaminopropiophenone can be nitrosated by following the procedure in Example 3. The acylation procedure with an acid chloride is illustrated by, but not retricted to, the following:

*Example 4. — p-Benzoylaminoprophenone*: 15 grams (0.1 mol) of p-aminopropiophenone are refluxed with 40 cc. (an excess) of benzoyl chloride for half an hour and then allowed to cool. 40 cc. of water are added and the reaction solution again brought to boiling and then permitted to cool. The cool solution is filtered to remove the precipitated p-benzoylaminopropiophenone which is then washed with cool dilute hydrochloric acid and the washings added to the original filtrate. The p - benzoylaminopropiophenone, recrystallized from alcohol as 20 grams of white crystals melting at 187–188° C. (corrected). The yield, allowing for recovery of the unbenzoylated starting material by precipitation upon making the original filtrates alkaline with 10% sodium hydroxide solution and cooling, is 95%.

*Example 5. — p-Benzoylaminoisonitrosopropiophenone*: To a suspension of 10 grams (0.04 mol) of p-benzoylaminopropiophenone (from Example 4) in 500 cc. of ether in an apparatus as used in Example 3, there are added in portions (as described in Example 3) 3.5 cc. (0.04 mol) of butyl nitrite, and the nitrosation is conducted as in the earlier example, and the crude p-benzoylamino-alpha-isonitrosopropiophenone (a new compound) recrystallized from alcohol as 8–9 grams of fine white crystals, decomposing at 207° C. (corrected), and after a further recrystallization from alcohol, melted at 209–210° C. (with decomposition), and further crystallization produced no change in melting point.

The various p-acylamino-alpha-isonitrosopropiophenone derivatives obtained as hereinabove described are then subjected to catalytic hydrogenation in two steps, by the first to reduce the isonitroso group to the amino group and by the second to reduce the keto group in the propiophenone radical to the secondary alcohol group, illustrated by, but not restricted to, the following:

*Example 6. — 1-(p-Aminophenyl)-2-amino-1-propanol from the reduction of p-acetamido-alpha-isonitrosopropiophenone*: The reduction is carried out in the catalytic-hydrogenation apparatus, made by the American Instrument Company, wherein the reduction takes place in a glass-lined steel bomb. There is used fresh catalyst prepared by adding 0.3 gram of palladium chloride and 3.0 grams of Norite decolorizing charcoal to 100 cc. of distilled water, and after the mixture is shaken in an atmosphere of hydrogen until saturated, filtering off the palladinized-charcoal thus obtained, washing with distilled water, followed by alcohol, then ether, and then drying with suction for about 5 to 10 minutes. 7.0 grams (0.032 mol) of p-acetamido-alpha-isonitrosopropiophenone and the freshly prepared catalyst are suspended in 100 cc. absolute alcohol containing 2 mols of dry hydrogen chloride per liter, and the mixture is shaken in an atmosphere of hydrogen at 200 pounds per square inch pressure and the reaction proceeds smoothly for 48 minutes until two-thirds of the theoretical quantity of hydrogen (1400 cc.) is taken up when the reduction stops. The catalyst is then filtered off and is completely extracted with hot alcohol to dissolve all of the undissolved reduction product, and the extract is combined with the original filtrate and evaporated to dryness over concentrated sulfuric acid, soda lime, and anhydrous calcium chloride in an evacuated desiccator, leaving 7.5 grams of white crystals, soluble in water, and warm alcohol, and insoluble in ether.

In the second stage of the reduction, the 7.5 grams of white crystalline product of its first stage are dissolved in 10 cc. of dilute hydrochloric acid and added to 90 cc. of water and 1.2 grams of freshly prepared catalyst in the same bomb, and the mixture shaken in an atmosphere of hydrogen at 100 lbs. per square inch for 30 minutes when the ketone takes up the theoretical amount (680 cc.) of hydrogen. The catalyst is filtered off, washed with water, and the filtrate and added washings evaporated to dryness over concentrated sulfuric acid, soda lime and anhydrous calcium chloride in a vacuum desiccator, to a white crystalline residue containing a yellow impurity. This material is then triturated with 15 cc. of cold absolute alcohol which removes most of this yellow color. The residue is then dissolved in 40 cc. of absolute alcohol containing a few drops of water, warmed gently on a hot plate and absolute ether added dropwise while shaking, to incipient crystallization, and then left to cool in the refrigerator. The dihydrochloride of 1-(p-aminophenyl)-2-amino-1-propanol separated in small, almost white plates melting at 191–192° C. (with decomposition). Yield 4.5 grams. Subsequent recrystallization gave 3.9 grams (52% yield) of product with same melting point. After drying over phosphorus pentoxide, in a vacuum desiccator, the product did not show a definite melting point but darkened and sintered at about 190° C. (depending on the rate of heating) and did not melt below 200° C. The corresponding p-acylamino-alpha-isonitrosopropiophenone derivatives in which the acyl group corresponds to the other fatty acids is reduced and de-acylated in the same manner as described in this particular example.

*Example 7.—Reduction of the p-benzoylamino-alpha-isonitrosopropiophenone:* (a) is carried out in the same two stage procedure, giving at the end of the first stage from 4.0 grams (0.013 mols) of starting isonitroso ketone, 3.5 grams of white crystals (81% yield), the hydrochloride of p-benzoylaminophenyl-alpha-aminoethyl ketone, soluble in water and hot alcohol and insoluble in ether, and which, recrystallized from hot alcohol, showed no sign of melting when heated up to 340° C. (corrected).

(b) In the second stage, the 3.5 grams of the hydrochloride of p-benzoylamino-phenyl-alpha-aminoethyl ketone reduced under similar conditions gave, after the vacuum desiccator drying, white crystals which, dissolved in absolute alcohol and filtered into boiling xylene, precipitated again into white crystals which, when washed with ether and dried, weighed 3.0 grams (71–72% yield) and did not melt below 340° C., representing 1 - (p - benzoylaminophenyl) - 2 - amino - 1 - propanol hydrochloride (a new compound).

Another embodiment of the basic process of the invention for converting p-aminopropiophenone to 1 - (p - aminophenyl) - 2 - amino - 1-propanol embraces the conversion of the p-amino group in the starting material to the p-nitro group, preferably by first converting the aminopropiophenone to a diazonium derivative, for example, with fluoroboric acid and an alkali metal nitrite such as sodium nitrite to obtain p - propionylphenyldiazoniumborofluoride, and treating the diazonium compound with a nitrite, for example, an alkali nitrite as sodium nitrite under conditions adapted to replace the p-diazonium group by the nitro group, then nitrosating the resulting p-nitropropiophenone to obtain the corresponding alpha-oximino derivative which then is reduced under conditions adapted to reduce both the alpha-oximino as well as the p-nitro groups to free amino groups, and also to reduce the keto group to the corresponding secondary alcohol groups. Thus this aspect of the invention is illustrated by, but not restricted to, the following:

*Example 8. — p - Propionylphenyldiazonium - borofluoride:* (a) To 43.9 cc. (0.25 mol) of 50% fluoboric acid stirred in a 500 cc. beaker are added 14.9 grams (0.1 mol) of p-aminopropiophenone. While the stirring is continued, 5 grams of finely divided ice are added and then slowly from a separatory funnel, 6.9 grams of sodium nitrite in 15 cc. of cold water are added while the temperature of the reaction mixture is held below 10° C. After all of the nitrite has been added, the solid which formed is collected on a sintered glass funnel, washed twice with cold alcohol and then three times with ether, and is partially dried by drawing air through it. The resulting brown, crystalline solid, dried over night in a vacuum desiccator, amounted to 20–22 grams of p - propionylphenyldiazoniumborofluoride (yield 85% of theoretical), decomposing at 85–86° C. When kept in a dark bottle at room temperature over a period of several weeks, this product gradually darkens.

The cost of this preparation is reduced, with high yields still obtained, by replacing some of the fluoboric acid by hydrochloric acid. The molecular ratios found best are 1 mol of p-aminopropiophenone, 1 mol of hydrochloric acid (100 cc. of concentrated acid), 1.25 mols of 50% fluoboric acid (220 grams of solution), and 1 mol of sodium nitrite, all dissolved in 150 cc. of water.

(b) *p-Propionylphenyldiazoniumchloride*: 0.1 mol of p-aminopropiophenone is dissolved in an excess of dilute hydrochloric acid. Then at room temperature, slowly drop by drop, is added an aqueous solution of 0.1 mol of sodium nitrite, during the addition of which the corresponding diazoniumchloride is precipitated. The precipitate is collected on a sintered glass funnel, washed with water, then with cool alcohol, followed by ether, and partially dried by drawing air through it, and then is dried overnight in a vacuum desiccator. The dried p-propionylphenyldiazoniumchloride, when place on a hot plate, does not explode, but merely decomposition occurs (on hydrolyzing with boiling water, it yields p-hydroxypropiophenone which, recrystallized from water, melts at 147–148° C., without depression in melting point when mixed with a known sample of that compound).

Either of the diazonium compounds described in both parts of this Example 8 or any other corresponding diazonium derivative, is then converted to p-nitropropiophenone by treatment with an alkali nitrite such as sodium nitrite under conditions adapted to permit replacing the diazonium group by the nitro group as illustrated by, but not restricted to, the following:

*Example 9.—p-Nitropropiophenone*: A fine, aqueous paste of 31.1 grams (0.125 mol) of p-propionylphenyldiazonium borofluoride (as obtained by Example 8–a) in 10 cc. of cold water is slowly added (over a one-half hour period) to a rapidly stirred suspension of 20 grams of precipitated copper metal powder in a solution of 80 grams of sodium nitrite in 160 cc. of water contained in a one liter beaker. The reaction is carried out at room temperature. A few cc. of ether are added from time to time to control the frothing caused by the nitrogen evolution, and the walls of the beaker are washed down from time to time with very small amounts of water. After no more diazonium compound is detected by test (by withdrawing from time to time a small amount of the mixture to see whether it produces a red coloration with a few drops of alcoholic alkaline beta-naphthol solution), stirring is continued for fifteen minutes. The reaction mixture is then made alkaline with 10% sodium hydroxide solution and stirred ten minutes longer. The reaction product is suction filtered, washed several times with water, twice with dilute sodium hydroxide solution, again with water, after which it is partially dried by sucking air through it, and is then extracted with hot 50% alcohol. On cooling, 4.8 grams (22% yield) of yellow crystals of p-nitropropiophenone melting at 86–87° C. were obtained. Recrystallization from hot water and decolorization with Norite decolorizing carbon yielded pale yellow crystals melting at 90–91° C. (corrected); further recrystallization produced no melting point change. The p-nitropropiophenone thus obtained is soluble in hot water, alcohol, benzene and ether; insoluble in cold alkali and water; and gives no reaction with ferric chloride solution (anaylsis: nitrogen found, Kjeldahl, 7.72 and 7.75%, calculated 7.82%; on oxidation of it with potassium permanganate in alkaline solution with refluxing until the purple color disappears, cooling and carefully acidifying with sulfuric acid, heating again and then cooling, and removing excess manganese dioxide by addition of a little sodium bisulfite solution, there is produced p-nitrobenzoic acid which, after being filtered off and recrystallized, melted at 240° C.).

*Example 10.—p-Nitro-alpha-oximino-propiophenones*: 9.0 grams (0.05 mol) of p-nitropropiophenone (as from Example 9) are dissolved in 150 cc. of ether in a half liter, three-necked flask equipped for nitrosation as in Example 3. Dry hydrogen chloride (generated by allowing concentrated sulfuric acid to drop on concentrated hydrochloric acid) is passed through the solution at 2 to 3 bubbles per second, while continually stirring. Then 3.2 grams (0.05 mol) of freshly distilled butyl nitrite are added in portions through the dropping funnel in the same manner as in Example 3. After all of the nitrite has been added (over about twenty minutes), stirring and addition of hydrogen chloride are continued for another fifteen minutes, after which the mixture is allowed to stand overnight at room temperature. Then the ethereal solution is slowly stirred into dilute sodium hydroxide, cooled with pieces of ice, the sodium hydroxide layer separated, and the ethereal solution repeatedly extracted with cold alkali until it remains colorless. The combined alkaline extracts are slowly stirred into concentrated hydrochloric acid containing enough ice to keep the reaction mixture cold. There are obtained 7.0 grams of white crystals melting at 129–130° C. (70% yield), which, after recrystallization from alcohol with decolorizing charcoal, melt at 132–3° C. with no change in melting point on further recrystallization.

*Example 11.—1 - (p - aminophenyl) -2-aminopropanol-1*: The p-nitro-alpha-oximino-propiophenone (as obtained in Example 10) is reduced to p-aminophenylpropanolamine either at atmospheric pressure or under pressure. In the reduction under pressure, to the hydrogenation apparatus, as used in Example 6, are added 3 grams (0.014 mol) of the p-nitro-alpha isonitrosopropiophenone, sufficient of the freshly prepared palladinized-charcoal catalyst (prepared as previously described), and 90 cc. of alcohol (containing 2 mols of hydrogen chloride per liter), and the mixture shaken in an atmosphere of hydrogen for 2 hours with the pressure of 200 pounds per square inch, dropping off to 176 pounds in 15 minutes and then dropping to 171 pounds over the balance of the time. The total of 1930 cc. of hydrogen was consumed in the first 80 minutes. The reaction product is then isolated by filtering off the catalyst, and evaporating the filtrate to dryness over concentrated sulfuric acid, soda lime, and anhydrous calcium chloride in a vacuum desiccator. The pale yellow crystals obtained are dissolved in warm alcohol with addition of decolorizing charcoal, and filtered slowly into boiling xylene. The thus precipitated white crystals are removed, washed with ether and dried by suction, yielding 2 grams (60%) of the p-aminophenylpropanolamine, decomposing at 192–193° C. (corrected) with no change in melting point on further recrystallization.

While the invention has been described with respect to certain specific embodiments of it, it is understood that various substitutions and modifications can be made within the scope of the appending claims.

What is claimed is:

1. The process for the preparation of 1-(p-aminophenyl)-2-amino-1-propanol which comprises mixing a compound selected from the group consisting of p-nitropropiophenone, p-(lower-alkanoylamino)-propiophenone, and p-benzoylamino-propiophenone with ether, then adding, in small portions and with stirring, a lower alkyl nitrite while simultaneously introducing dry hydrogen chloride, continuing the addition of dry hydrogen chloride for an additional 15 to 30 minutes, then allowing the reaction mass to stand overnight, extracting the alpha-oximino ketone from the ethereal solution with repeated portions of a cold alkaline solution, then precipitating the alpha-oximino ketone by slowly stirring the alkaline extract into cold mineral acid, shaking a suspension of the isolated alpha-oximino ketone and palladinized charcoal in absolute ethanolic hydrogen chloride in an atmosphere of hydrogen at on the order of 200 lbs. pressure per square inch for ¾ to 2 hours, then removing the catalyst and, when the p-nitropropiophenone starting material is used, obtaining the 1-(p-aminophenyl)-2-amino-1-propanol hydrochloride from the filtrate by removal of the solvent, and when a lower-alkanoyl and benzoyl starting material is used, removing the solvent following the first hydrogenation step, dissolving the crystals obtained in acidulated aqueous medium and again hydrogenating at on the order of 100 lbs. pressure per square inch for about 30 minutes in the presence of palladinized charcoal, removing the catalyst and, in the case of the alkanoyl derivative, heating the solution to hydrolize the acyl-amino group, and in the case of either derivative removing the solvent to obtain 1-(p-aminophenyl)-2-amino-1-propanol hydrochloride.

2. The process according to claim 1 in which the absolute ethanolic hydrogen chloride contains on the order of 2 mols of hydrogen chloride per liter of alcohol and the acidulated aqueous medium contains on the order of 10 cc. of dilute hydrochloric acid in 90 cc. of water.

3. The process according to claim 1 in which the starting material is p-nitropropiophenone, the lower-alkyl nitrite is butyl nitrite, and the absolute ethanolic hydrogen chloride contains on the order of 2 mols of hydrogen chloride per liter of alcohol.

4. The process according to claim 1 in which the starting material is p-acetylamino-propiophenone and the lower-alkyl nitrite is butyl nitrite, the absolute ethanolic hydrogen chloride contains on the order of 2 mols of hydrogen chloride per liter of alcohol and the acidulated aqueous medium contains on the order of 10 cc. of dilute hydrochloric acid in 90 cc. of water.

5. The process according to claim 1 in which the starting material is p-benzoylaminopropiophenone and the lower-alkyl nitrite is butyl nitrite, the absolute ethanolic hydrogen chloride contains on the order of 2 mols of hydrogen chloride per liter of alcohol, and the acidulated aqueous medium contains on the order of 10 cc. of dilute hydrochloric acid in 90 cc. of water.

WALTER H. HARTUNG.

REFERENCES CITED

The following references are of record in the file of this patent:

UNITED STATES PATENTS

| Number | Name | Date |
|---|---|---|
| 1,898,258 | Oberlin | Feb. 21, 1933 |
| 1,989,093 | Hartung | Jan. 29, 1935 |
| 1,995,709 | Hartung | Mar. 26, 1935 |
| 2,359,707 | Baltzly et al. | Oct. 3, 1944 |

OTHER REFERENCES

Hartung et al.: J. Am. Chem. Soc., vol. 52, pp. 3317–3318 (1930).

Hartung et al.: J. Am. Chem. Soc., vol. 53, pp. 4153–4160 (1931).

Starkey: J. Am. Chem. Soc., vol. 59, pp. 1479–1480 (1937).

Fieser et al.: Organic Chemistry (D. C. Heath, Boston, 1944), page 606.

Hartung et al.: J. Am. Pharm. Assoc., vol. 35, pp. 15–19 (1946).